United States Patent [19]

Turko et al.

[11] Patent Number: 5,121,214
[45] Date of Patent: Jun. 9, 1992

[54] METHOD FOR ELIMINATING ARTIFACTS IN CCD IMAGERS

[75] Inventors: Bojan T. Turko, Moraga, Calif.; George J. Yates, Santa Fe, N. Mex.

[73] Assignee: The United States of America as represented by the United States Department of Energy, Washington, D.C.

[21] Appl. No.: 545,732

[22] Filed: Jun. 29, 1990

[51] Int. Cl.⁵ .................. H04N 3/14; H04N 5/335
[52] U.S. Cl. ................. 358/213.19; 358/213.26; 357/24
[58] Field of Search ........... 358/213.19, 213.26, 358/213.15, 213.18, 213.23, 213.27, 213.29, 213.31, 213.24, 213.11; 357/24 LR; 250/332, 370.08

[56] References Cited

U.S. PATENT DOCUMENTS

| | | | |
|---|---|---|---|
| 4,032,976 | 6/1977 | Levine | 358/213 |
| 4,322,753 | 3/1982 | Ishahara | 358/213 |
| 4,396,950 | 8/1983 | Roth | 358/213 |
| 4,450,484 | 5/1984 | Terakawa et al. | 358/213 |
| 4,656,519 | 4/1987 | Savoye | 358/213 |
| 4,689,687 | 8/1987 | Koike et al. | 358/213.29 |
| 4,733,023 | 3/1988 | Kinoshita et al. | 358/213.26 |
| 4,734,773 | 3/1988 | Veda | 358/213.13 |
| 4,742,395 | 5/1988 | Nagai et al. | 358/213.19 |
| 4,774,533 | 9/1988 | Noda et al. | 358/213.19 |
| 4,783,702 | 11/1988 | Sone et al. | 358/213.19 |
| 4,800,435 | 1/1989 | Ikeda et al. | 358/213.19 |
| 4,837,629 | 6/1989 | Shiromizu et al. | 358/213.19 |
| 4,856,033 | 8/1989 | Hirota | 357/24 LR |
| 4,884,142 | 11/1929 | Suzuki | 358/213.19 |

Primary Examiner—James J. Groody
Assistant Examiner—Glenton B. Burgess
Attorney, Agent, or Firm—Miguel A. Valdes; Roger S. Gaither; William R. Moser

[57] ABSTRACT

An electronic method for eliminating artifacts in a video camera (10) employing a charge coupled device (CCD) (12) as an image sensor. The method comprises the step of initializing the camera (10) prior to normal read out and includes a first dump cycle period (76) for transferring radiation generated charge into the horizontal register (28) while the decaying image on the phosphor (39) being imaged is being integrated in the photosites, and a second dump cycle period (78), occurring after the phosphor (39) image has decayed, for rapidly dumping unwanted smear charge which has been generated in the vertical registers (32). Image charge is then transferred from the photosites (36) and (38) to the vertical registers (32) and read out in conventional fashion. The inventive method allows the video camera (10) to be used in environments having high ionizing radiation content, and to capture images of events of very short duration and occurring either within or outside the normal visual wavelength spectrum. Resultant images are free from ghost, smear and smear phenomena caused by insufficient opacity of the registers (28) and (32), and are also free from random damage caused by ionization charges which exceed the charge limit capacity of the photosites (36) and (37).

8 Claims, 3 Drawing Sheets

METHOD FOR ELIMINATING ARTIFACTS IN CCD IMAGERS

BACKGROUND OF THE INVENTION

The invention described herein arose in the course of, or under, contract No. DE-AC03-76SF00098 between the United States Department of Energy and the University of California for the management and operation of Lawrence Berkeley Laboratory, and Contract No. W-7405-ENG-36 between the United States Department of Energy and the University of California for the management and operation of Los Alamos National Laboratory.

The present invention relates to charge coupled devices such as are used for image sensors in video camera equipment, and more particularly to an electronic method for eliminating smear and ghosts from the images produced by such devices. The predominant current usage of the method of the present invention is in charge coupled devices used as image sensors in high ionization environments, particularly where events of relatively short duration are to be captured.

Charge coupled devices (CCDs), while not having been originally developed specifically for the purpose, have been found to be useful as optical sensing devices in video cameras. In fact, CCDs are the predominant current means for capturing visual images and transforming those images into electrical signals. A CCD consists of an array of capacitors suitably designed so that they are coupled and, therefore, charges can be moved through the semiconductor substrate in a controlled manner. When used as an image sensor, the individual capacitor locations are arrayed in the form of a rectangle such that there are a quantity of rows, with each row consisting of a quantity of individual locations. This is in accordance with conventional electronic imaging schemes. The charge carrying substrata (the registers) are isolated from direct effects of exposure to light by an opaque covering. Contiguous to the register layers are corresponding photosite areas wherein photodiodes, which gain a charge proportional to their exposure to light, are placed behind a photosensitive phosphor material. The photodiodes usually are designed to respond, essentially, to the visual spectrum. However, the camera can be made to respond to wavelengths outside the visual spectrum by using a phosphor that is excited by the desired wavelength, but which emits light in the spectrum to which the photodiodes will respond. The opaque covering on the registers must be such that, while it is resistant to transmittal of photons, it will transfer charge from the photosensitive area to the register layer.

Available CCD sensors, based on how the image is generated and read out, are designated as full frame, frame transfer or interline transfer type devices. Interline area sensors in high frame rate video cameras. The image transfer from photosites to opaque charge transport registers takes place simultaneously in interline transfer devices, and can take as little as 1 micro second. Frame transfer CCDs take much longer to shift the whole image into the opaque frame storage area. Full fame imagers do not have storage capability. Unless a light shutter (keeping the image integration and the read out cycles apart) is used, such devices may show a substantial image blur.

In interline transfer type CCDs, there are two photodiodes, called photosites or "pixels", directly juxtaposed to each individual register location, with the photosites arranged as alternating "even" and "odd" photosites. After the photosites have been charged by exposure to light, and have transferred their charges to their corresponding register locations, the registers are then "read out" by one or more charge coupled amplifiers, which produce an electrical output signal proportional to a sensed charge level.

In interline transfer CCDs images are read out serially under the control of a sequence of clock signals. First, the charges contained in the even photosites are transferred to the registers. Then the top "horizontal" register row is sequenced in bucket brigade fashion to the charge coupled amplifier. Then, the rows are shifted up by one row, and the new top row is sequenced past the charge coupled amplifier. These steps are repeated until the entire register set is read out. Because, as described herein, the charge has been transferred from every other row of photosites (in this case, the even photosites) to the vertical registers prior to the registers being read out, the reading out of the entire register set results in a sequence of signals which, combined, represent "every other row" of the image, which signals are temporarily stored in a memory. The charges from the odd photosites are then transferred to the registers, and the registers are read out as described above to produce a signal for the remaining rows, which signals are combined with the previously captured signals to produce an "interleaved" signal containing all the lines of the picture. Alternatively, the charges from both the even and the odd photosites can be transferred to the registers before the register are first read out, but this results in an image with only half the resolution as compared to the method described previously.

While virtually all CCD area sensors are made for standard video rates of 30 frames per second or less, frame rates can be increased by raising the clock frequency until the device limit is reached. So far, of the various types of CCDs, the interline transfer CCDs have been successfully clocked up to 500 frames per second, while all other types have lower limits.

However, interline transfer CCD sensors are not completely blur free. Vertical transport registers that shift the image line by line during the read out may have a degree of photosensitivity. Although the registers are shielded from light by an aluminum layer, some photons stray from the photosensitive pixels into the adjacent register area, generating undesirable photoelectrons. This photocharge becomes superimposed upon the image already stored in the register, causing the smear. Optical and mechanical properties of the CCD surface are responsible for the magnitude of the smear. Oblique incident photons, and also diffraction, refraction, and waveguide effects in the phosphorous silicate glass layer on the CCD surface contribute to the smear effect. Moreover, strong ionizing radiation can produce undesirable excessive charges in the registers and the photosites, which result in random "white spots" in the equivalent electrical signal and any image reproduced thereby. More recent interline transfer CCDs have been substantially improved, but the improvement is still not sufficient for critical applications.

Various methods for eliminating the unwanted charges which cause smear and other visual aberrations have been tried. One of the most successful general approaches has been to clock unwanted charge out of the registers during a non-read portion of the frame cycle. Examples of variations of this approach are found in U.S. Pat. No. 4,734,733 issued to Ueda, and in U.S. Pat. No. 4,742,395 issued to Nagai et. al.. The Ueda patent teaches a method for purging electrons from the shift register which are errantly transferred thereto while the transfer gate signal is low, by providing high speed clock pulses during exposure time. The Nagai Patent teaches a method for clocking out excessive charge in the registers after charges have first been transferred to the registers after charges have first been transferred to the registers from the photosites and before a second such transfer. These two patents embody the general principle of attempting to clock out all unwanted charges during a part of the frame cycle. However, they do not comprise an exhaustive list of such methods, as numerous unique variations based upon on this general concept have been found worthy of U.S. Patent protection.

While the principle of clocking out unwanted charges from the registers has been explored by a number of inventors, with varying degrees of success, the fact that ghosts and other unwanted charge generated images persist attests to the fact that no prior art method has been entirely successful. Clearly, it would be desirable to find a way to improve the purging process, and thereby improve video images generated by CCD imagers. Such an improvement becomes increasingly important in relation to the need to capture images of very short duration, or very high contrast images, or images created by strong ionizing radiation. When these adverse factors are combined, the need for an improved method becomes critical. Such a combination of adverse conditions is frequently confronted by researchers in various fields.

Therefore, there is clearly a need for a method to eliminate artifacts and ghost images while maintaining fast read out of adverse images even under adverse conditions. To the inventor's knowledge, no prior art method or combination of methods or devices has resulted in optimal image generation when used under the above mentioned adverse conditions.

SUMMARY OF THE INVENTION

Accordingly, it is an object of the present invention to provide a means for reducing the undesirable effects of ionization radiation in interline transfer charge coupled devices.

It is another object of the present invention to provide a means for reducing ghosting and smear caused by the lack of perfect opacity of vertical charge transfer registers in charge coupled devices.

It is still another object of the present invention to provide a video camera using a charge coupled device capable of high speed clocking while retaining acceptable image quality.

It is yet another object of the present invention to provide a method for electronically eliminating smear in interline transfer charge coupled devices.

It is still another object of the present invention to provide method for producing high quality images using a charge coupled device.

It is yet another object of the present invention to provide a method for producing high quality images that is particularly useful for recovering images produced from phosphorescent screens excited by strong ionizing radiation.

It is still another object of the present invention to provide a means to prevent distortion in the capturing of high contrast images by charge coupled devices.

Briefly, the preferred embodiment of the present invention is an electronic video camera having a conventional interline transfer type charge coupled device as its image capturing element, wherein circuitry is provided to accomplish a sequence of events which quickly dump unwanted charges prior to the image being read out.

The inventors have found that a key to effective purging of unwanted charges has been an improved understanding of the causes of these charges, and the timing of purging cycles so as to best eliminate the unwanted charges as they occur. The inventors have further discovered that, because of the particular nature and timing of the development of unwanted charges as produced by various phenomena, a plurality of charge purging cycles is required to most effectively effectuate the desired objective.

The "fast dump" method described here allows for first clocking the radiation caused artifacts out during the image integration period. Register generated smear (called "ghost" image under pulsed light conditions) is then eliminated next during the second fast dump cycle. The ghost is dumped into the horizontal register by rapid pulsing of the vertical register, leaving the image still intact in the photosites. The "clean" image is transferred into the now cleared registers after the second, ghost dumping cycle is completed. The image can be clocked out either as a pair of interlaced video fields, or combined into a single image. Each field read out time can be as short as 2 ms.

An advantage of the present invention is that unwanted charges created by various factors and occurring during different time portions of a frame cycle are effectively purged.

Another advantage of the present invention is that ghosting and smear caused by the lack of perfect opacity of the vertical charge transfer registers is greatly reduced.

A further advantage of the present invention is that unwanted charges created by strong ionizing radiation are purged from the charge transfer registers prior to read out.

Yet another advantage of the present invention is that image aberrations caused by unwanted excessive charges in interline transfer charge coupled devices are corrected.

Still another advantage of the present invention is that distortion of images in charge coupled device imagers caused by strong ionizing radiation, excessively high contrast, and various other causes is reduced.

Yet another advantage of the present invention is that the inherent speed advantage of interline transfer charge coupled devices is not sacrificed to improve the images produced thereby.

These and other objects and advantages of the present invention will become clear to those skilled in the art in view of the description of the best presently known mode of carrying out the invention and the industrial applicability of the preferred embodiment as described herein and as illustrated in the several figures of the drawing.

DETAILED DESCRIPTION OF THE INVENTION

The best presently known mode for carrying out the invention is a conventional interline transfer charged coupled device camera equipped with circuitry to implement the inventive method for eliminating undesirable artifacts from a resultant regenerated image. The predominant expected usage of the inventive method for eliminating artifacts in CCD imagers is for capturing images of relatively short duration such as in scientific research work, particularly for capturing those created on phosphorescent screens excited by strong ionizing radiation wherein an ability to reduce the undesirable effects of ionizing radiation and of high contrast images is most desirable. The best presently known embodiment of the invention is primarily adapted for capturing single events, rather than a series of events, although the principles of the invention are applicable to either situation.

Figure 1:
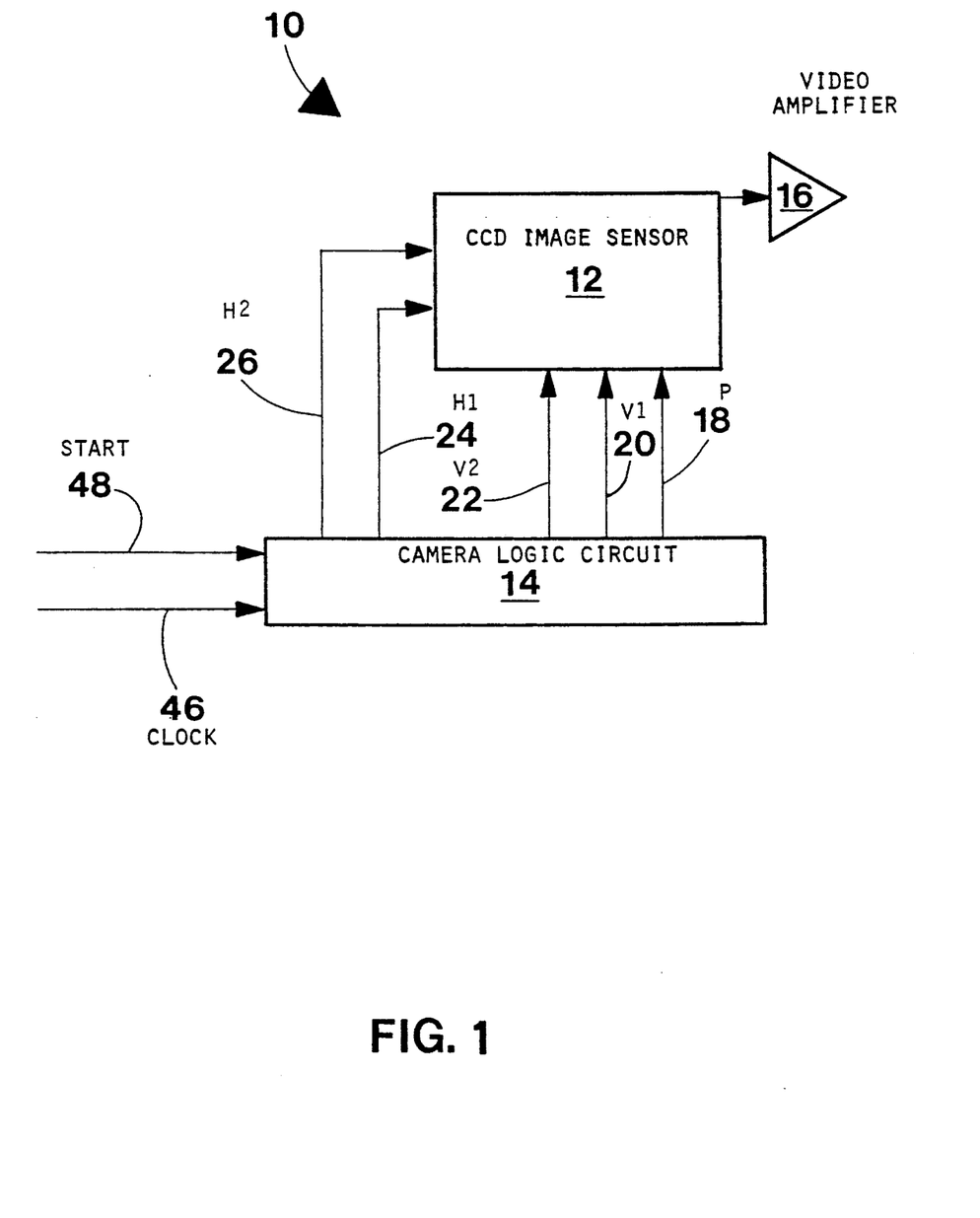
FIG. 1 is a block schematic diagram of a CCD camera showing timing circuit interconnections relevant to the intention.

The camera of the presently preferred embodiment of the present invention is illustrated in block schematic diagram form in FIG. 1 and is designated therein by the general reference character 10. In many of its substantial components, the camera 10 does not differ significantly from conventional CCD video cameras.

The conventional elements of the camera 10 include a CCD image sensor 12, a camera logic circuit 14, and a video amplifier 16. A photogate clock pulse ("P clock") line 18, a first vertical clock pulse ("V1") line 20, a second vertical clock ("V2") line 22, and first horizontal clock pulse ("H1") line 24 and a second horizontal clock pulse ("H2") line 26 are connected between the camera logic circuit 14 and the CCD 12. Power and bias connections (not shown) are, of course, also provided to the various circuits of the camera 10. These are entirely conventional in nature, and are not related to the novel aspects of the invention. Therefore, power and bias circuit connections are omitted from the illustration of FIG. 1 for the sake of clarity.

Although systems using a Sony ICX016 CCD imager have also been tested, a Fairchild Weston CCD 222 imager is employed as the image capturing device in the presently preferred embodiment of the invention.

Figure 2:
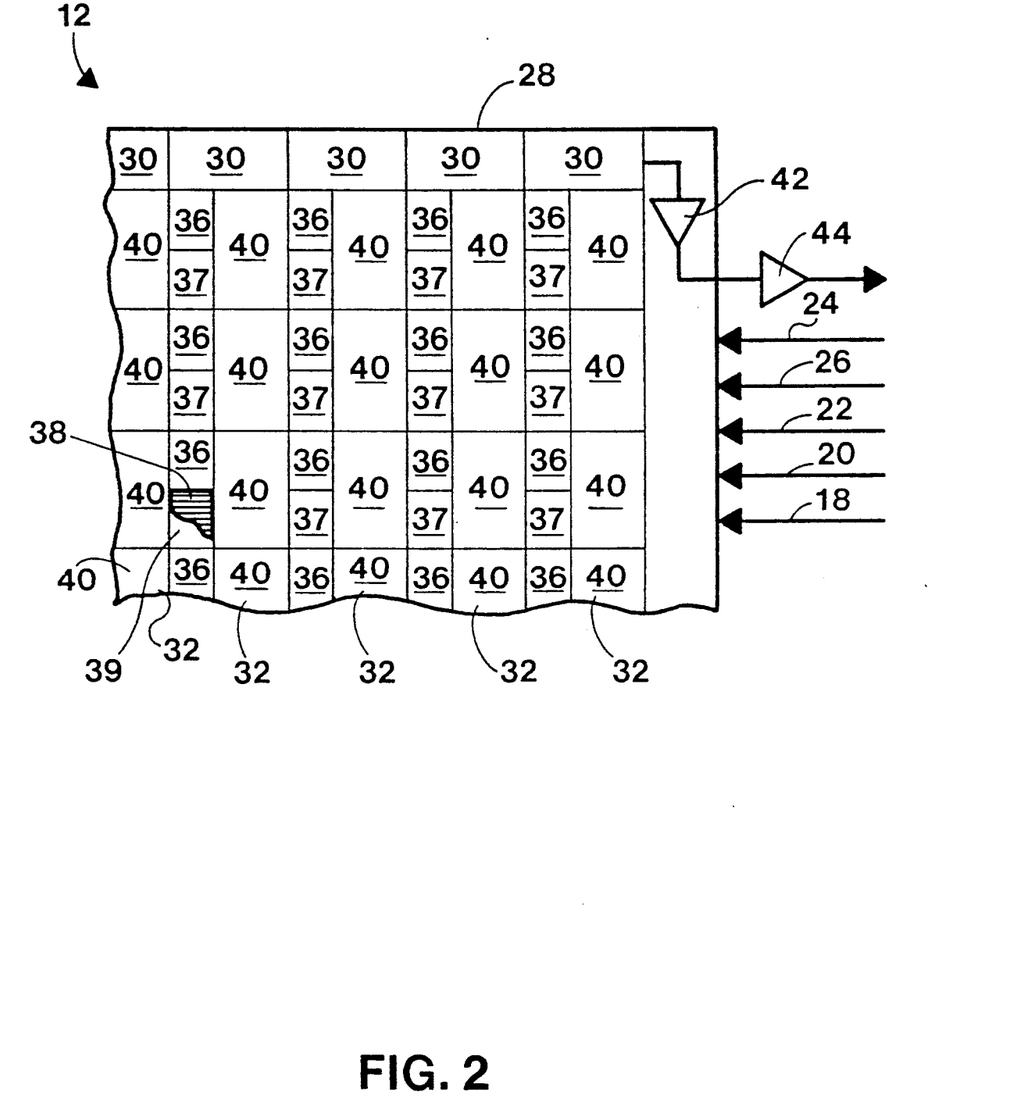
FIG. 2 is a diagrammatic representation of a portion of a CCD imager.

Referring now to FIG. 2, wherein is shown a diagrammatic representation of a portion of the CCD 12, it can be seen that a horizontal transport register 28 is apportioned into a series of horizontal register locations 30. Beneath the horizontal transport register 28 an alternating series of opaque vertical transport registers 32 and photosite arrays 34 are vertically positioned. The photosite arrays 34 are each further apportioned into an alternating series of even photosites 36 and odd photosites 37. Each photosite 36 and 37 has a photodiode portion 38 situated behind a phosphor covering 39. The vertical transport registers 32 are each further apportioned into a series of vertical register locations 40, each adjacent to either an even photosite 36 or an odd photosite 37. It should be emphasized that FIG. 2 is a diagrammatic representation of the functional parts of the CCD 12, and that the various parts thereof described herein and illustrated in the drawing are not visually distinguishable in the actual physical manifestation. In the Fairchild Weston 222 CCD 12 used in the presently preferred embodiment of the invention, there are 380 each of horizontal register locations 30, vertical transport registers 32 and photosite arrays 34. The Fairchild Weston 222 CCD 12 also has 244 vertical register locations 42 per vertical transport register 32.

The camera logic circuit 14 (FIG. 1) supplies a series of timing signals for moving stored charges first from the photosites 36 and 37 to the vertical registers 32, and then through the vertical registers 32 and the horizontal register 28. According to ordinary usage in the field, when a signal is present upon any timing signal carrying circuit or wire that circuit or wire is referred herein to as being "high". When no signal is present on such timing signal carrying circuits or wires, those circuits or wires are referred to herein as being "low".

To move charges through the registers 28 and 32, a sequence of two clock signals is required. This is known as two phase clocking, and is a standard clocking scheme for most modern CCDs. Each time that the H1 line 24 goes high and the H2 line 26 then goes high, charges stored in the horizontal transport register 28 are moved in bucket brigade fashion one horizontal register location 30 toward a charge coupled amplifier 42, which produces an electrical output signal corresponding in magnitude to the strength of the charge instantaneously present at its input. Recovered signal is further processed by a video amplifier 44 and sent to conventional picture signal processing circuitry (not shown). Each time that the V1 line 20 goes high, and the V2 line 22 then goes high, charges stored in the vertical transport registers 32 are moved one vertical register location 40 toward the horizontal register 28. The P line 18 is normally high while charges are being clocked through the 17 registers 28 and 32. When the P line 18 goes low and the V1 line 20 goes high while the P line 18 remains low, charge is transferred from the even photosites 36 to their corresponding vertical register locations 30. When the P line 18 goes low and the V2 line 22 goes high while the P line 18 remains low, charge is transferred from the odd photosites 37 to their corresponding vertical register locations 30. As discussed previously, and as is shown in FIG. 1, the status of the clock lines 18, 20, 22, 24 and 26 is controlled by the camera logic circuit 14. The camera logic circuit 14 also provides signals for blanking the video amplifier 44 between read out of video lines, and for synchronizing the camera 10 with an external video processor, where required.

Normally, the camera 10 runs in a presettable mode wherein charges are first transferred from the photosites 36 and 37 to the vertical transport registers 32. The charges in the vertical transport registers 32 are then clocked up one vertical register location 30 with the charges in those register locations 30 immediately adjacent to the horizontal transport register 28 being shifted into the horizontal register locations 30. Then, the charges in the horizontal register locations 30 are repeatedly clocked across to the charged coupled amplifier 42 until the entire horizontal transport register 28 has been read out. The camera logic circuit 14 then blanks the video amplifier 44 while the charges in the vertical transport registers 32 are again clocked up one vertical register location 40. The horizontal register 28 is again read out, as described above. The sequence is repeated until all of charges originally transferred from the photosites 36 and 37 have been shifted out of the vertical register locations 40 and read by the charge coupled amplifier 42. This constitutes the reading of a full video frame. The rate of reading frames is fixed if the internal clock (not shown), which is built into the camera logic circuit, 14 is used. However, rates of up to 500 frames per second are possible if a variable frequency external clock signal is provided on an external clock input line 46 (FIG. 1). The camera 10 can be reset at any time by an external pulse to an external start line 48 (FIG. 1). It will remain reset for the duration of this pulse. The camera 10 resumes normal operation after the end of the reset pulse or, if desired, sequences for image artifact elimination may be run first, before the artifact free image is read out.

Now beginning a discussion of the process of electronic artifact elimination, it is a property of the interline transfer CCD image sensor 12 that two video lines can be combined into one by clocking the vertical registers 32 two steps up prior to reading out the horizontal transport register 28. This results in the charges of two lines of vertical register locations 40 being combined in the horizontal register locations 30. In this manner, any portion of a video field can be compressed by appropriate programming of the sequence of clock signals. In the extreme case, the charge of the whole video field (all of the vertical register locations 40) can be compressed into a single video line, and that resultant line can then be "dumped" out of the horizontal register 28 by sequencing the combined charges out past the charge coupled amplifier. This scheme is used in the "fast dump" sequences for rapidly clearing the vertical registers 32 of image artifacts. As long as the photogate P clock line 18 stays high when the V1 line 20 and the V2 line 22 are high, the photosites 36 and 37 remain isolated from the vertical registers 32.

The desirability of such artifact elimination sequences results from the fact that unwanted charges are produced in the CCD 12 which should be eliminated prior to image read out. Each CCD photosite 36 and 37 generates a charge proportional to the intensity of illumination. However, "dark" charge is also generated by the photosites 36 as a function of ambient temperature. Additional charge may be generated in photosites 36 exposed to strong ionizing radiation. In extreme cases, the charge due to radiation may overflow the charge capacity of the affected photosite 36. Reconstructed images will be "damaged" by randomly distributed white spots.

The vertical registers 32 may also generate photocharge due to insufficient effective "opacity". As discussed previously herein, although the vertical registers 32 are designed to be as opaque to photon admission as possible, this quality is limited by the fact that they must be transparent to charge transfer from the photosites 36. Therefore, the vertical register locations 40 will be charged by exposure to the image light source, and that charge will be superimposed on the charge that has been transferred to other register locations 40 and is being shifted through the vertical registers 32. As can be appreciated, this will result in a "smear" in the video image Alternatively, under pulsed light conditions, a single "ghost" image will be produced by this unwanted additional charging of the vertical register location 40.

Because of the fact that the vertical register locations will themselves be charged by exposure to an image light source, if the vertical transport clock lines V1 20 and V2 22 do not go high during the image integration period (the period during which the photosites 36 and 37 are being exposed to light and charge is being developed therein) so that charge is not being transferred through the vertical register 32, the register location 40 next to each even/odd pixel pair 36 and 37 becomes effectively a third pixel. If the charge from all three pixels (the even photosite 36, the odd photosite 37, and the "effective" photosite which is really the corresponding vertical register location 40) is combined before the start of the frame read out a smear-free image results. However, with a continuous light source, the light source must be shuttered before the charge transfer to obtain a smear-free image. If pulsed light source is used, the light intensity must drop to a negligible level before the start of the vertical clocking of the image. Yet another obvious drawback of this method is the loss of spatial resolution since the even and the odd image field must be combined prior to the read out. Also, the method of combining charges from even photosites 36 and odd photosites 37 would not work if a radiation damaged image must be cleared out at the time the new "clean" image is generated in the photosites. However, the method of the present invention will specifically purge a radiation damaged image while the new image is simultaneously generated in the photosites, and without a necessary loss of resolution, in addition to 22 purging the "ghost" image from the registers prior to image read out.

Figure 3:
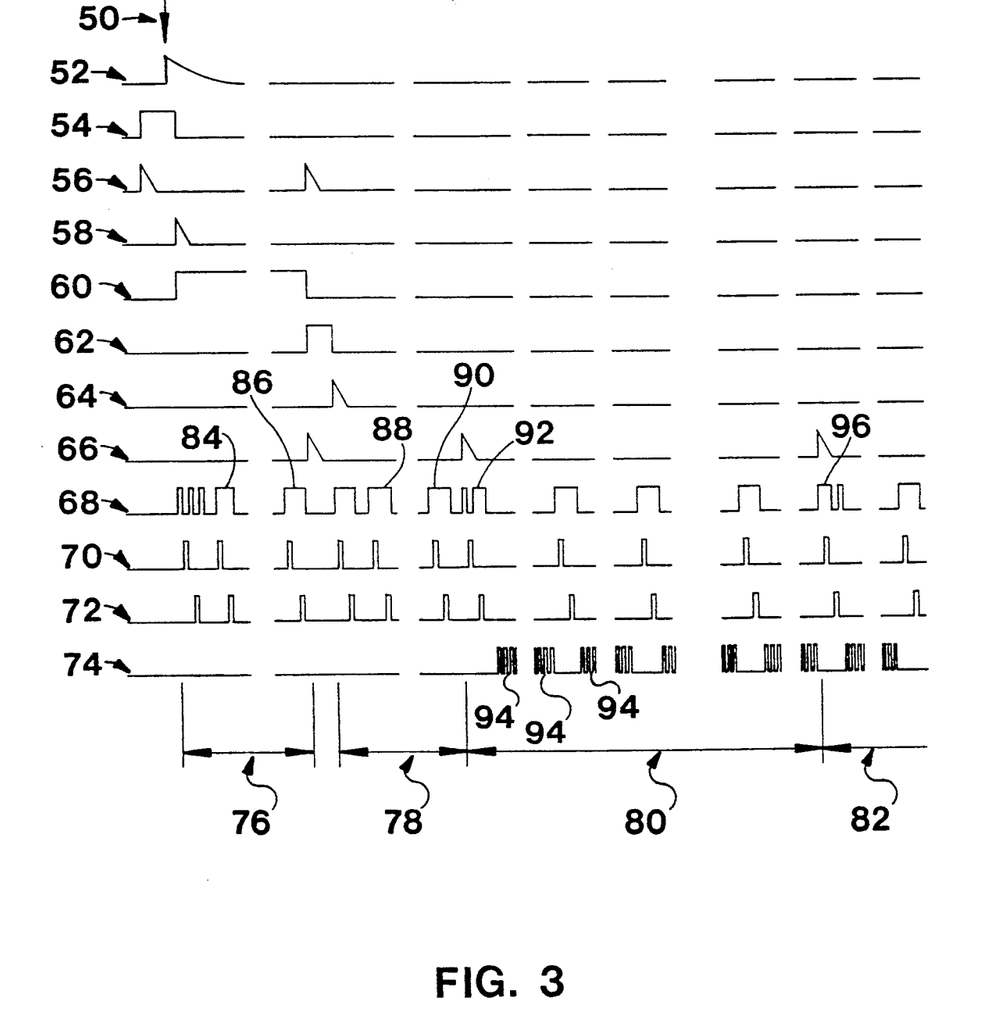
FIG. 3 is a timing diagram showing the relative timing relationship of events and signals relevant to the invention.

Now beginning a discussion of the timing relationship of events and signals according to the unique method of artifact elimination of the present invention, FIG. 3 is a timing diagram depicting the relative time relationships of significant timing signals. One skilled in the art will recognize that, while the timing relationships shown in FIG. 3 are those actually used in the best presently known embodiment of the invention, a number of variations are possible within the scope of the invention. "High" signal states are depicted, in conventional fashion, by portions of the respective lines which rise above the base line ("low" state). The phenomenon and signals depicted in FIG. 3 are shown in relation to an event occurrence 50, which is the instant at which the visual (or non-visual, if the event is outside the visible spectrum) event which is to be "captured" takes place. A phosphor illumination period 52 is the period of time during which the phosphor 39 of the photosites 36 and 37 remains excited. As discussed previously herein, the phosphor 39 may be such that it is excited by visible light, or by a non-visible spectrum, depending upon the nature of the event to be captured. Signals shown in FIG. 3 are an external reset pulse 54, a stop pulse 56, a first dump start pulse 58, a first dump run status indicator 60, a second dump timer 62, a second dump start pulse 64, an end of frame pulse 66, a P (photogate) clock pulse 68, a V1 vertical transfer pulse 70, a V2 vertical transfer pulse 72, and a video output 74. The P pulse 68, the V1 pulse 70, and the V2 pulse 72 are created within the camera logic circuit 14 (FIG. 1) and are communicated to the CCD 12 via the P line 18 (FIG. 1), the V1 line 20, and the V2 line 22, respectively. Any clock pulse signal discussed herein which is not designated as being communicated from or to a designated portion of the camera 10 is an internal signal within the logic circuit and exists therein in accordance with the normal operation of existing prior art camera logic circuits except for the timing variations specifically discussed.

According to the method of the present invention, radiation caused artifacts are dumped during a first fast dump cycle period 76, which corresponds in time to the period during which the image is being integrated into the photosites 36 and 37. Register generated smear (or "ghost" in this case, since we are here concentrating on a pulsed light condition, as previously explained) is then eliminated next during a second fast dump cycle period 78, during which period the ghost is dumped into the horizontal register 28 by rapid pulsing of the vertical registers 32, leaving the image still intact in the photosites 36 and 37. The "clean" image is then transferred into the now cleared registers after the second, ghost dumping cycle 78 is completed. The image can be clocked out either as a pair of interlaced video fields, or combined into a single image. In the preferred embodiment, as described herein, the image is read out as an interlaced pair of fields during a first frame read out period 80, and a second frame read out period 82. Each field read out time can be as short as 2ms. If it is desired to capture a series of events, rather than a single event, the camera 10 could be reset at the end of the second frame read out period 82, or it could be set to automatically restart the sequence at the beginning of the first dump cycle, as required. However, in accordance with the best presently known embodiment as described herein the camera 10 is operating in a triggered mode to capture a single event, and what happens after the second frame read out period 82 is of no consequence.

In the triggered mode, upon the receipt of the external reset pulse 54, the camera 10 is first reset and then starts executing the image artifact elimination procedure. The external reset pulse 54 is produced by equipment (not shown) external to the camera 10, according to the timing of the event as determined by the needs of the experiment in which the camera 10 is used. The external reset pulse 54 is received by the camera logic circuit 14 (FIG. 1) on the external start line 48 (FIG. 1). The stop pulse 56 is generated by the camera logic 14, and initiates a "clear" routine which resets the camera 10 to an initial condition.

The image occurring at the event time 60 is temporarily retained on the phosphor 39 (FIG. 2). The external reset pulse 54 is applied a short time before the event. The leading edge of the reset pulse 54 stops all clocks in the camera and initializes the logic circuit 14 (FIG. 1). Unwanted photocharge may be generated in the sensor by the radiation associated with the event. The camera is restarted by the trailing edge of the reset pulse 54, occurring shortly after the event when the radiation is ceased.

The operation starts with the first dump cycle, when the first dump start pulse 58 goes high, by transferring the radiation generated photocharge from both the even photosites 36 and the odd photosites 37 (FIG. 2) into the vertical registers 32 (FIG. 2). The charge is transferred whenever the photogate clock pulse 68 is low for the duration of the vertical clock pulses 70 and 72. The V1 clock pulse 70 transfers charges from the even photosites 36 when the P pulse 68 is low, and the V2 clock pulse 72 transfers charges from the odd photosites 37 when the P pulse 68 is low. The dump cycle is characterized by a rapid sequence of 244 shifts of the vertical registers 32 (FIG. 1) as caused by 244 repeats of a V1 pulse 70 followed by a V2 pulse 72, with no significant shifts in the horizontal register 28 (FIG. 2). This means that, essentially the whole field is dumped into the horizontal register 28 (FIG. 2).

The timing diagram of FIG. 3 does not describe a continuous time spectrum. Rather, for extended time periods wherein a great number of repetitive cycles occur, the chart is broken and the majority of the repetitive cycles are not shown, in order to keep the size of the diagram workable, and to emphasize the important individual portions which are depicted. The first example of this occurs between the first dump cycle first P pulse 84 and the first dump cycle 244th P pulse 86. During the time period for which specific pulses are omitted there are, of course, 242 intervening P pulses (not shown), each with an associated intervening V1 pulse (not shown) and an intervening V2 pulse (not shown).

As can be seen in the timing diagram, the first dump run status indicator 60 stays high during the first dump cycle period 76. After the vertical registers 32 (FIG. 2) have been cleared (by 244 cycles of vertical pulses 70 and 72), the horizontal register 28 (FIG. 2) is cleared by rapidly sequencing to high first the H1 line 24 (FIG. 2) and then the H2 line 26 (FIG. 2) 380 times (there are 380 horizontal register locations 30). The first dump run status indicator 60 then goes low, which triggers the end of frame pulse 66 and the stop pulse 56 high and starts the second dump timer 62.

The decaying image on the phosphor 39 is integrated into the photosites during the first fast dump cycle period 76. It is important to note that the image is taken from the phosphor 39 after the event instant 50 has ended. Therefore, the phosphor 39 is critical to the invention, since without it, the timing of the first dump cycle to occur during image integration would not be possible. The phosphor 39 also provides the additional advantage, discussed elsewhere herein, of allowing the camera to respond to spectra other that those by which the photodiodes are directly affected.

The second dump cycle starts at the time when the phosphor 39 image has already decayed. The second dump start pulse 64 starts the second fast dump cycle period 78 at the end of the second dump timer 62. The length of the second dump timer 62 is sufficient to allow the excitation of the particular phosphor 39 used to fully decay prior to the second dump start pulse 64. The image is not transferred at this time however (the photogate clock P 68 is high for the duration of the vertical clocks 70 and 72). This time the vertical clocks 70 and 72 rapidly dump the unwanted smear (or "ghost") charge, which was generated in the vertical registers 40 (FIG. 2). The timing diagram of FIG. 3 does not show the repetitive series between the second P pulse of the second dump cycle 88 and the 244th P pulse of the second dump cycle 90. At the end of the second dump cycle period 78 the camera logic circuit 14 allows the start of the normal read out cycle.

The remainder of the frame read out sequence is of a conventional nature. While either a combined type read out, or an interlaced type read out is possible, the timing diagram of FIG. 3 illustrates the higher resolution interlaced type read out. The first frame read out period 80 begins with the charges in the even photosites 36 (FIG. 2) being shifted to the vertical registers 32 (FIG. 2) when the V1 clock 70 goes high while the P clock 68 is low, at an even photosite charge shift P pulse 92. Notice that charges in the odd photosites 37 (FIG. 2) are not shifted to the vertical registers 32 (FIG. 2) at this time because the even photosite charge shift P pulse 92 is high while the V2 clock 74 goes high. Each succeeding pair of vertical clock pulses 70 and 72 then shifts charges in the vertical registers 32 (FIG. 2) one vertical register location 40 toward the horizontal register 28. The video output 74 of FIG. 3 is a diagrammatic representation of the series of pulses that occur when the horizontal register locations 30 are read out after each shift of the vertical register 32. A video output burst 94 is a representation of a read out of a full line from the horizontal register 28 (FIG. 2). Of course, each video output burst 94 is comprised of 380 individual video pulses (not shown), and there will be 244 video output bursts 94 during the first frame read out period 80. The second frame read out period 82 is identical to the first frame read out period 80, except that charges in the odd photosites 37 (FIG. 2) are shifted to the vertical registers 32 during an odd photosite charge shift P pulse 96. After both the first frame read out period 80 and the second frame read out period 82, the full image is created by combining the interlacing images already produced. If desired, the camera 10 can then be retriggered to start the process again.

The circuitry to produce the above described sequence of pulses is all conventional in nature, and one skilled in the art can readily produce or modify a camera to operate according to the method of the present invention given the information of the timing chart of FIG. 3, and the description thereof as disclosed herein. Modification of timing signals produced by the camera logic circuit 14 is accomplished by altering a digital instruction set, according to instructions supplied by the manufacturer of the Fairchild Weston CCD 222 imager.

As is shown above, in great part, the camera 10 according to the present invention closely resembles prior art conventional CCD cameras in many respects. The substantial difference exists in the inclusion of circuitry for implementing the inventive method for purging unwanted excessive charges form the CCD photosites and registers, and for timing the purge cycles. No significant changes of materials are envisioned nor are any special constructions required.

Various modifications may be made to the invention without altering its value or scope. For example, while the best presently known mode of the invention has been described herein in terms of a camera for capturing the image of single short duration events, the inventive method for artifact elimination is also effective for use in creating "moving" pictures of longer duration events. The only required modification would be to restart the camera after each full frame read out, in order to reinitiate the dump cycle sequences. Such a modification would be entirely practical for cameras operating in high light contrast situations.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The CCD imaging camera of the present invention are adaptable for use in any application in which CCD imaging cameras are currently used, and the improved characteristic of the improved camera of the present invention will allow for it use in applications wherein prior art cameras would not provide a suitably usable image output. The predominant current usages are for research applications wherein a high quality image must be produced under the adverse conditions of high contrast image, high ambient ionizing radiation, and short duration events. The main area of improvement is in timing and coordination of charge purging to coincide with periods of maximum effectiveness of such cycles.

Since this invention is an enhancement to CCD cameras which already have industrial and commercial value, and in fact is easily manufactured and incorporated in present systems, it is believed that the invention will find considerable use.

The described method for artifact elimination in interline transfer CCD sensors has been shown to be useful in applications where the intense ionization radiation and the transport register smear seriously affect the quality of images. Although some newer sensors have substantially improved smear characteristics, the quality of high contrast images may still suffer. Radiation effects are still present and only extensive shielding may reduce these effects. The implementation of the present method is simple and the only penalty is a somewhat longer frame read out time extended by fast dump cycles. Actually, the image integration time, taking place during the first dump cycle (when radiation artifacts are being eliminated) may need additional extension if the image phosphor 39 decaying time is long. However, the lost time can be recovered by clocking the image read out faster. The total frame read out from the start of an event can still be completed in a few milliseconds. So far, several such cameras have been built and tested.

As described herein, this method is most effective for recovering images made from phosphorescent screens excited by strong ionizing radiation. Both the CCD artifacts caused by radiation and image smear due to the insufficient "opacity" of charge transport registers can be eliminated by this method. The method is less effective for imaging under continuous light. The smear is dumped at the beginning of each frame, but then increases gradually across the screen. On the average, the smear is reduced by a factor of two in such applications.

Since the CCD cameras of the present invention may be readily constructed, are physically significantly similar to prior art conventional devices, and are completely electrically compatible with existing ancillary equipment such as variable sweep rate synchronizing video monitors and recorders, it is expected that they will be acceptable in the industry as substitutes for the conventional CCD cameras. For these and other reasons, it is expected that the utility and industrial applicability of the invention will be both significant in scope and long-lasting in duration.

We claim:

1. A method for eliminating artifacts in charge coupled device imagers, said imagers including a plurality of vertical registers, a horizontal register, and a plurality of photosites, each of said photosites including a photodiode and an adjacent phosphor portion, in steps comprising:
   A. a first process step of initializing the imager prior to a normal read out including,
      a.1. a first dump cycle comprising substeps of first transferring charges for the photosites to the vertical registers, followed by the transferring of charges from the vertical registers to the horizontal register, followed by the transferring charges out of the horizontal register; and a.2. a second dump cycle, comprising the substeps of first transfer charges from the vertical registers to the horizontal register followed by the transferring of charges out of the horizontal register; and B. a second process step of normal image reading by sequentially transferring charges through the vertical registers, then through the horizontal registers, and finally to a charge coupled amplifier for conversion to a video signal, wherein;

the first dump cycle (a.1.) is accomplished during a period of time wherein a decaying image on said photosite phosphor portions is being integrated into the photosite photodiodes;

the second dump cycle (a.2.) is accomplished after the image has decayed from said phosphor portions;

the first dump cycle (a.1.) clears the photosites and the vertical registers of radiation generated charge; and the second dump cycle (a.2.) clears the vertical registers of photon generated smear charge.

2. The method for eliminating artifacts of claim 1, further including:

C. a third process step of reinitializing the imager after the second process step (B.) by restarting the first process step (A.), so as to create an endless loop of process steps comprising the first process step (A.) and the second process step (B.), thereby causing the imager to produce a series of signals corresponding to a series of images.

3. The method for eliminating artifacts of claim 1, wherein the charge coupled device imagers are interline transfer type charge coupled devices.

4. A method for eliminating artifacts in charge coupled device imagers, said imagers including a plurality of vertical registers, a horizontal register, and a plurality of photosites, each of said photosites including a photodiode and an adjacent phosphor portion, in steps comprising:

A. a first process step of initializing the imager prior to a normal read out including, a.1. a first dump cycle comprising substeps of first transferring charges from the photosites to the vertical registers, followed by the transferring of charges from the vertical registers to the horizontal register, followed by the transferring charges out of the horizontal register; and a.2. a second dump cycle, comprising the substeps of first transfer charges from the vertical registers to the horizontal register followed by the transferring of charges out of the horizontal register; and B. a second process step of normal image reading by sequentially transferring charges through the vertical registers, then through the horizontal registers, and finally to a charge coupled amplifier for conversion to a video signal, wherein;

the first dump cycle (a.1.) is accomplished during a period of time wherein a decaying image on said photosite phosphor portions is being integrated into the photosite photodiodes;

the second dump cycle (a.2.) is accomplished after the image has decayed from said phosphor portions;

each of the photodiodes attains an electrical charge proportional to an intensity of incident illumination within a photodiode response frequency spectrum of electromagnetic energy;

said photosite phosphor portions include a phosphorescent material which is excited by a phosphor excitation frequency spectrum, said phosphor excitation frequency spectrum being at least partially outside the band of said photodiode response frequency spectrum; and the photosite phosphor portions, when excited, generate electromagnetic energy emissions, at least a portion of said emissions having frequencies within the band of said photodiode response frequency spectrum;

such that the electric charges gained by the photodiodes is proportional to an intensity of incident illumination within said phosphor excitation frequency spectrum.

5. In a video camera having an interline transfer charge coupled device imager including a horizontal shift register, a plurality of vertical shift registers, and a plurality of photosites, each photosite including a photodiode portion and a phosphor portion, and said video camera further including a camera logic circuit for providing a series of timing signals which control the operation of the camera, the improvement comprising:

timing circuitry means inserted into the camera logic circuit for implementing a first dump cycle for eliminating unwanted radiation caused charges during an image integration period followed by a second dump cycle for eliminating unwanted register generated charges, both of said dump cycles occurring prior to an image read out cycle, wherein;

said first dump cycle moves charges from the photosites, to the vertical shift registers, to the horizontal register, and out of the horizontal register; and said second dump cycle leaves charges in the photosites undisturbed, while moving charges from the vertical registers to the horizontal register, and then out of the horizontal register.

6. The improved video camera of claim 5, wherein:

said first dump cycle occurs after occurrence of a selected observable event, and after energy released by said event has excited the phosphor portions of the photosites, and while the photodiode portions of the photosites are each attaining electrical charges proportional to individual electromagnet radiation energies incident thereon.

7. The improved video camera of claim 5, wherein:

said timing circuitry means further provides for repeating said first dump cycle and said second dump cycle after said image read out cycle, thus creating an endless loop comprising said first dump cycle, said second dump cycle, and said image read out cycle.

8. In a video camera having an interline transfer charge coupled device imager including a horizontal shift register, a plurality of vertical shift registers, and a plurality of photosites, each photosite including a photodiode portion and a phosphor portion, and said video camera further including a camera logic circuit for providing a series of timing signals which control the operation of the camera, the improvement comprising:

timing circuitry means inserted into the camera logic circuit for implementing a first dump cycle for eliminating unwanted radiation caused charges during an image integration period followed by a second dump cycle for eliminating unwanted register generated charges, both of said dump cycles occurring prior to an image read out cycle, wherein;

the phosphor portions of the photosites are excited by a first energy spectrum, said first energy spectrum being produced by an external event; and the phosphor portions of the photosites, when excited, emit a second energy spectrum, said second energy spectrum being that which will result in an electrical charge being generated in the photodiode portions of the photosites, and said second energy spectrum further being within the visual spectrum of light;

thereby providing for production of an image of said external event, even through said first energy spectrum produced by the event is outside the second energy spectrum, which results in an electrical charge being produced in the photodiodes.

* * * * *